March 3, 1936. R. L. CARTER 2,032,976
ADJUSTABLE TAPER RIPPING JIG
Filed Nov. 8, 1934
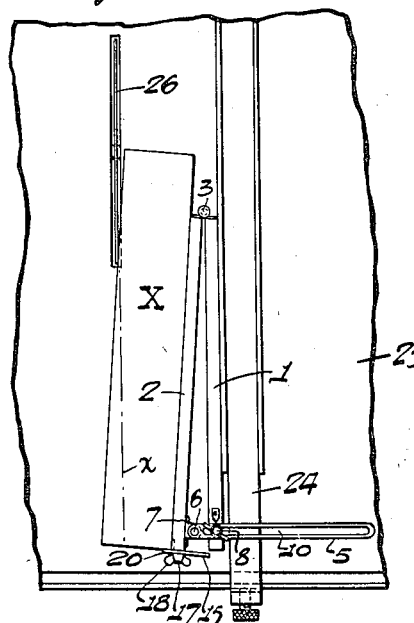
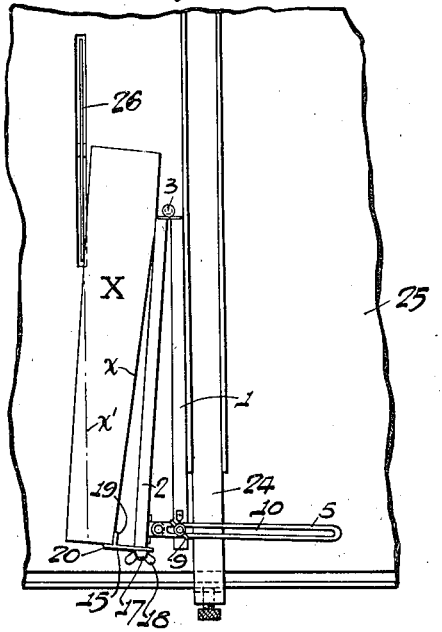
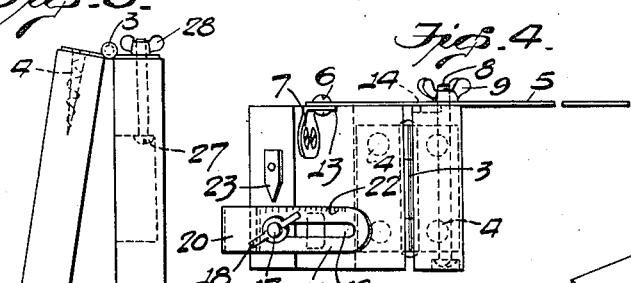
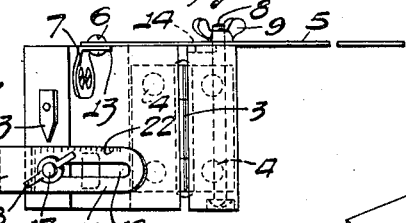
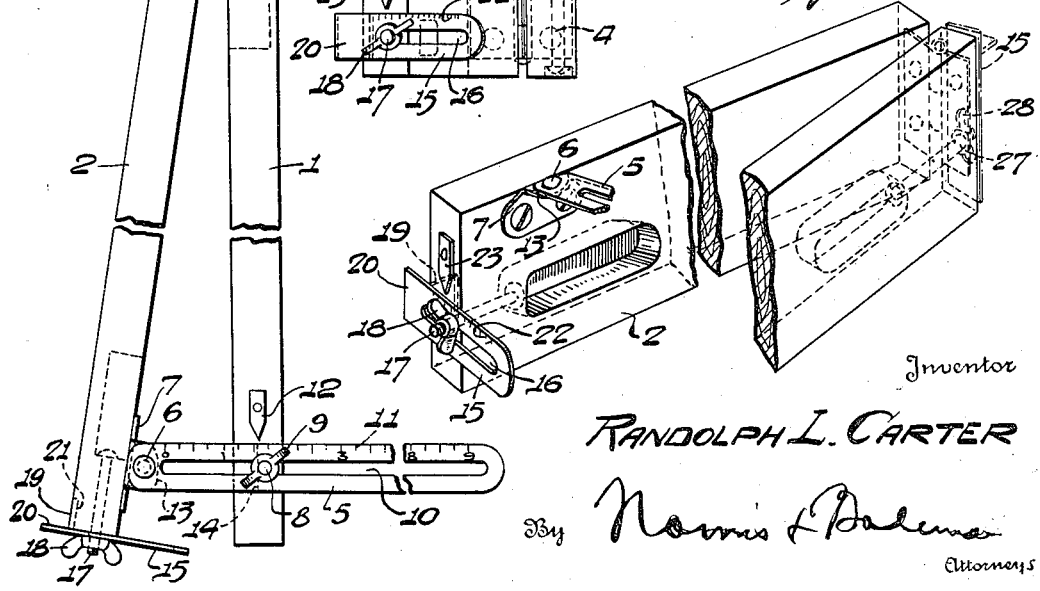
Inventor
RANDOLPH L. CARTER
By
Attorneys Patented Mar. 3, 1936

2,032,976

UNITED STATES PATENT OFFICE 2,032,976

ADJUSTABLE TAPER RIPPING JIG

Randolph L. Carter, San Antonio, Tex.

Application November 8, 1934, Serial No. 752,178

8 Claims. (Cl. 143—169)

The present invention relates to a jig adapted to be used to position a piece of work at an angle to enable the work to be cut at an angle or taper, and it relates more particularly to a jig adapted to be placed against the ripping gauge of a circular saw or band saw to position a piece of lumber to be sawed or ripped at an angle or on a taper, as for example, in the making of the tapered legs of tables, chairs, stools and the like, and for similar purposes.

One of the primary objects of the invention is to provide a novel jig of this class which is so constructed that it may be readily set to hold the piece of work at different desired angles to produce taper cuts at different angles, as may be desired.

Another object is to provide a jig of this class which embodies a novel end stop for the piece of work, such stop being mounted movably on the jig so that it may be set in one position to hold the piece of work against endwise displacement in relation to the jig while a taper cut is being made on one side of the piece of work, and which may be set in another position to hold the piece of work against endwise displacement and also hold the previously taper cut side of the piece of work at such a distance from the work-engaging side of the jig as to compenate for the taper cut made at that side of the work when the latter is turned to bring its opposite side into position to be cut on a taper, the improved stop thus facilitating the cutting of pieces of work first with a taper at one side and then turned and cut with an equal or any other desired taper on the other side.

Further objects of the invention are, to provide a novel and improved jig of this class which can be readily and conveniently applied to the usual rip gauge of an ordinary circular saw or band saw to adapt it to taper ripping or cutting of pieces of lumber at different desired angles, and to provide means for facilitating the adjustments of the jig for taper ripping at different angles and for indicating such adjustments.

To these and other ends the invention consists in certain improvements and combinations and arrangements of parts all as will be hereinafter more fully described, the features of novelty being pointed out more particularly in the claims at the end of this specification.

In the accompanying drawing:

Figure 1 is a top plan view of the table of a circular saw having the improved jig provided by the present invention mounted thereon to position a piece of wood or other work for taper ripping at one side;

Figure 2 is a view similar to Fig. 1 but showing the jig set to position the piece of work for the taper ripping of the opposite side thereof;

Figure 3 is a top plan view showing the improved jig provided by the present invention on an enlarged scale;

Figure 4 is an end elevation of the jig as viewed from the lower end in Fig. 3; and Figure 5 is a perspective view, partly broken away, of the jig provided by the present invention.

Similar parts are designated by the same reference characters in the different figures.

The jig provided by the present invention is adapted to be used generally for positioning pieces of work so that they may be cut at various desired angles, the jig however being especially adapted for use upon a circular saw or band saw and in cooperation with the usual ripping gauge on the saw table for positioning pieces of wood or lumber to be ripped at different desired angles or degrees of taper, as for example in the making of the tapered legs of tables, chairs, stools and the like. The preferred embodiment of the invention is shown in the accompanying drawing and will be hereinafter described in detail, but it is to be understood that the invention is not restricted to the precise construction shown since equivalent constructions are contemplated and such would be included within the scope of the claims.

As shown in the accompanying drawing, the improved jig comprises a pair of arms or members 1 and 2, which may be composed of strips of wood or other suitable material of rectangular cross-section and suitable length, these members being pivotally connected at one end by a hinge 3 so that they may be adjusted into parallelism or into different angular relationships. The hinge 3 may be of any ordinary form, the plates of which may be secured as by screws 4 to the respective ends of the members 1 and 2.

Means is provided for holding the members 1 and 2 in different longitudinally angular relationships, such means comprising preferably a link 5 pivotally connected by a pivot pin 6 to a bracket 7 which may be fastened by screws or otherwise to the inner side of the member 2, the member 1 having a threaded stud 8 secured therein and provided with a wing nut 9 threaded thereon, the stud 8 being positioned to extend through a slot 10 formed longitudinally in the link 5 and the wing nut being operative to clamp the link 5 immovably against the upper edge of the member 1. By loosening the thumb nut 9 and thus unclamping the link 5, the members 1 and 2 may be swung into different longitudinally angular positions to conform with the different angles at which it is desired to cut or rip the work, and the tightening of the thumb nut 9 secures the members in set angular relationship. Means is provided for indicating the different angles at which the members 1 and 2 may be set in relation to one another and thus facilitate the setting thereof, such means comprising a suitably graduated scale 11 on the link 5 and a cooperating pointer 12 secured to the upper edge of the member 1. The upper laterally turned edge 13 of the bracket 7 is adapted to overlie the upper edge of the member 1 when the members 1 and 2 are brought into parallelism, the upper edge of the member 1 being provided for this purpose with a recess 14 to accommodate the portion 13 of the bracket 7. In order to enable the jig to be folded into compact form for shipment or storage, the wing nut 9 is removable from the threaded stud 8 so that the link 5 may be detached from this stud and then swung into a position above the upper edge of the member 1 and in parallelism therewith.

The free end of the member 2 is provided with an end stop 15 which serves to prevent longitudinal displacement of the piece of work in relation to the jig while the work is being cut or ripped, and this end stop, according to the present invention, is capable of positioning a piece of work with one side lying directly against the outer side of the member 2, as when a piece of wood or other material of rectangular form is to be ripped or cut with a taper at one side and of positioning such a piece of work at a properly spaced distance from the outer side of the member 2 to compensate for the previous taper cutting of a side of such piece of work when the same is turned to present its opposite side for taper ripping or cutting at a corresponding angle. The improved stop comprises a strip of metal or other suitable material having a slot 16 extending longitudinally therein to receive a threaded screw or bolt 17 fixed in the end of the member 2 and provided with a clamping or wing nut 18. The stop 15 is adjustable transversely of the length of the member 2 and the stop has a flange 19 formed integrally therewith or otherwise fixed thereon and projecting toward the hinged end of the member 2. The end 20 of the stop projects outwardly or laterally beyond the flange 19, and the outer side of the member 2 or the face thereof against which the piece of work is placed, is formed with a recess 21 of a size and shape to receive the flange 19 when the stop is adjusted to its innermost position, thereby enabling the outer face of the flange 19 to lie flush or in the same plane with the outer or work engaging face of the member 2. As shown in Fig. 3, while the end stop is set in its innermost position, the outer end 20 thereof will project outwardly beyond the outer work engaging face of the member 2 and will thus be in a position to engage an end of the piece of work and thus hold it against endwise displacement on the jig. When the stop is moved outwardly from its innermost position, the flange 19 thereon will be moved outwardly a corresponding distance laterally beyond the outer work engaging face of the member 2 the end 20 of the stop projecting beyond the flange 19 thereon so that it may function as an end stop for the work. Means is provided for indicating the different settings for the end stop, such means comprising a suitably graduated scale 22 along one edge of the stop 15 and a cooperating pointer 23 fixed to the adjacent end of the member 2. In using the improved jig on a circular saw or band saw, one member of the jig, such as the member 1 thereof, is placed against the usual rip gauge 24 provided on the table 25 of the saw and the piece of work X is placed against the outer face of the member 2 in position to be cut or ripped by the saw 26, a circular saw being shown for example in the present instance. The members 1 and 2 of the jig are set at the proper angle conforming with the angle of the taper at which the work is to be cut or ripped, setting of the members 1 and 2 being permitted by loosening the thumb nut 9 and these members being held in proper angular relation by tightening of this thumb nut. If a piece of rectangular wood or material is to be ripped on a taper at one side, the end stop 15 is set in its innermost position as shown in Fig. 3 and one side of the piece of wood or material X is placed against the outer side of the member 2 with one end resting against the stop 15. By sliding the jig along the rip gauge towards the saw, the piece of wood or material X will be caused by the end stop to move therewith and to be ripped along one side by the saw on a taper corresponding to the angle between the members 1 and 2, as indicated by the dotted line $x$ in Fig. 1. When a piece of wood or material, previously ripped on a taper at one side $x$ in the manner shown in Fig. 1 is to be ripped on a taper of corresponding angle as indicated by line $x'$ at the opposite side, the stop 15 is adjusted outwardly on the member 2 to set the flange 19 thereon at a distance from the outer or work engaging face of the member 2 corresponding to the taper previously cut on a side of the piece of work and the latter is placed against the outer face of the member 2 so that its previously tapered side will be engaged by the flange 19 and thereby spaced from the outer face of the member 2 a distance to compensate for the previous taper cutting of this side of the work, the end of the work engaging the projecting end 20 of the end stop as shown in Fig. 2, so that when the jig and the work are advanced along the rip gauge toward the saw, the latter will cut the opposite side of the piece of work along the line $x'$ on a taper of the same angle as that of the taper previously cut. The taper cutting of work at opposite sides thereof at the same angle may thus be accomplished with facility and without the necessity of changing the angle between the members 1 and 2.

The improved jig provided by the present invention enables pieces of wood or other material to be ripped or cut at different desired angles of taper, the necessity of using separate jigs for the cutting of difference angles of taper being unnecessary. The improved end stop is adjustable so that it may be set to properly position a piece of work on the jig for the taper cutting or ripping of such work at one side only, and it may be set to position a previously tapered side of a piece of work to be set so that the opposite side of the work may be taper cut or ripped at the same angle, the shoulder on the end stop being positioned to compensate for the amount of material that has already been tapered off from the other side of the work thus holding the tapered side of the work in an exactly similar relation to the saw as that occupied by the side of the work before the same was tapered. By graduating the scales 11 and 22 of the link 5 and end stop 15 to correspond with one another, the indication of the angle at which the members 1 and 2 are set, by the scale 11 on the link 5 will indicate the proper setting of the end stop 15 by its scale 22.

As previously stated, the link 5 may be folded into a position above the member 1 so that it extends parallel thereto when the jig is to be shipped or stored, and the end stop 15 may be detached from the member 2 by removing the wing nut 18 and the end stop may be placed vertically against an end of the member 1 and clamped thereto by a screw 27 in the member 1 and a cooperating wing nut 28 removably threaded on this screw.

I claim as my invention:—

1. A jig for positioning a piece of work for cutting thereof at an angle, comprising a pair of members pivotally connected at extremities thereof and presenting opposite outer sides adjustable into different angular relations, a side of one of said members being engageable with a side of the piece of work to position it, and a stop on said member located at the extremity thereof opposite to its pivoted extremity to abut against an end and adjacent side of the piece of work and adjustable transversely of said member to position the piece of work both longitudinally and angularly with respect to the work-engaging member of the jig.

2. A jig for positioning a piece of work for taper ripping, comprising a pair of oppositely disposed members pivotally connected at extremities thereof and foldable against one another into parallelism and adjustable from one another into different angular relations, the outer side of one of said members being engageable with the piece of work to position it at an angle to the outer side of the other member, and a stop on the work engaging member located at the extremity thereof opposite to its pivoted extremity to abut against an end of the piece of work to position the latter endwise and having a portion engageable with a side of the piece of work, the stop being adjustable transversely of the work-engaging member to position the piece of work angularly with respect to the work-engaging member of the jig.

3. A jig for positioning a piece of work for taper ripping, comprising a pair of members pivotally connected at extremities thereof to swing in a common plane toward and from one another into different angular relations, the outer sides of said members being straight and presenting flat surfaces, the outer side of one of said members being engageable with the piece of work to position it at an angle to the outer side of the other member, a stop on the work engaging member located at the extremity thereof opposite to its pivoted extremity to abut against an end of the piece of work to position the latter endwise with respect to the jig, a link pivotally connected to one of said members and slidably with respect to the other member near the free ends of said members, and securing means between the slidable portion of said link and the respective member for holding said members in different angular relations.

4. A jig for positioning a piece of work for taper ripping, comprising a pair of members having means for pivotally connecting them at one end for adjustment into different angular relations, one of said members having a face engageable with a side of the piece of work, and an end stop for the work mounted for adjustment transversely of the work engaging face of said member and having a portion thereon engageable with an end of a piece of work to position it longitudinally on the respective member, and having a projection thereon engageable with a side of the piece of work to space it at different distances from the work engaging face of said member.

5. A jig for positioning a piece of work for taper ripping, comprising a pair of members having means for pivotally connecting them at one end for adjustment into different angular relations, one of said members having a face engageable with a side of the piece of work, and an end stop for the work mounted for adjustment transversely of the work engaging face of said member and having a projection thereon overlying said face of said member and engageable with a side of the piece of work to space it at different distances from the work engaging face of said member, the member on which said stop is mounted having a recess in its work engaging face to receive the overlying projection on the stop and thereby allow said projection to lie flush with said work engaging face.

6. A jig for positioning a piece of work for taper ripping, comprising a pair of members having means for pivotally connecting them at one end for adjustment into different angular relations, one of said members having a face engageable with a side of the piece of work, and an end stop for the work mounted for adjustment transversely of the work engaging face of said member and having a projection thereon extensible and retractible with respect to the work engaging face of said member and engageable with a side of the piece of work to space it at different distances from the work engaging face of said member, said stop also having a portion beyond said projection thereon engageable with an end of a piece of work to position it longitudinally on said member while said projection is in extended and retracted positions, said stop having a scale thereon to indicate the different settings thereof transversely of the work engaging face.

7. A jig for positioning a piece of work for taper ripping on opposite sides, comprising a pair of members pivotally connected for adjustment into different angular relations, the outer face of one member being engageable with a side of the piece of work, and an end stop for the work mounted on an end of the work engaging member to engage an end of the piece of work to position it longitudinally thereon and adjustable transversely of the work engaging face thereof and having a projection thereon disposed inwardly from its outer end, said work engaging face having a recess to receive said projection and thereby allow a side of a piece of work to lie against said face and the projection on the stop being settable by the transverse adjustment of the stop at different distances from said work engaging face to space a side of the work at different distances therefrom.

8. A jig of the class described comprising a pair of members having means pivotally connecting them for adjustment into different angular relations, an element extending between and connecting said members for holding said members in different angular relations, an end stop on one of said members adjustable transversely thereof and having a projection thereon engageable with a piece of work to space it at a distance from a face of said member, and corresponding scales on said element and stop for indicating the angular relations of said members and the corresponding transverse adjustments of said stop.

RANDOLPH L. CARTER.